United States Patent [19]

Duchesneau et al.

[11] Patent Number: 5,037,271
[45] Date of Patent: Aug. 6, 1991

[54] PITCH CONTROL SYSTEM

[75] Inventors: Jerome G. Duchesneau, Andover; Robert A. Schwartz, Vernon, both of Conn.

[73] Assignee: United Technologies Corporation, Hartford, Conn.

[21] Appl. No.: 457,129

[22] Filed: Dec. 26, 1989

[51] Int. Cl.⁵ .............................................. B64C 11/40
[52] U.S. Cl. ................... 416/47; 416/157 R; 416/165
[58] Field of Search ................ 416/25, 27, 30, 31, 416/44, 47, 157 R, 165; 60/403; 91/28

[56] References Cited

U.S. PATENT DOCUMENTS

| | | | |
|---|---|---|---|
| 2,720,927 | 10/1955 | Mergren et al. | 416/27 X |
| 2,761,518 | 9/1956 | Treseder et al. | 416/47 |
| 2,840,170 | 6/1958 | Best | 416/47 |
| 2,840,171 | 6/1958 | Jedrziewski et al. | 416/47 |
| 2,865,460 | 12/1958 | St. John, Jr. | 416/47 |
| 2,913,056 | 11/1959 | Farkas | 416/44 X |
| 3,261,406 | 7/1966 | Goodman et al. | 416/31 X |
| 3,302,724 | 2/1967 | Brooks et al. | 416/27 |
| 3,589,830 | 6/1971 | Morgren et al. | 416/27 X |
| 4,028,004 | 6/1977 | Wind | 416/157 R |
| 4,523,891 | 6/1985 | Schwartz et al. | 416/157 |
| 4,533,296 | 8/1985 | Duchesneau et al. | 416/47 X |
| 4,588,354 | 5/1986 | Duchesneau et al. | 416/27 |

FOREIGN PATENT DOCUMENTS 790226  2/1958  United Kingdom ................. 416/47

Primary Examiner—Edward K. Look
Assistant Examiner—James A. Larson
Attorney, Agent, or Firm—Lloyd D. Doigan; William W. Habelt

[57] ABSTRACT

A pitch control system has a main electronic control, a mechanical back-up control and a switching system for transferring pitch control from the electronic to the mechanical control in the event of electronic control failure. The switching system utilizes a switch for comparing the output of the electronic and mechanical control systems, the switch choosing the mechanical system if a failure occurs in the electronic control system. In certain failure modes, an enable solenoid simultaneously locks out the switch, to ensure mechanical pitch change control, and resets the mechanical back-up control to provide a lower degree of pitch control than conventional back-up controllers.

5 Claims, 2 Drawing Sheets

PITCH CONTROL SYSTEM

DESCRIPTION

1. Technical Field

The present invention relates to a system for controlling the pitch of a variable pitch propeller system.

2. Background Art

Typically, variable pitch propeller systems include; a plurality of propeller blades extending radially from a hub, a mechanical pitch actuating system attaching to the blades, a control system for controlling the actuating system, and an engine for rotating the hub. In most modern aircraft, the actuating system is of the hydraulic variety. An example of such a system is shown in U.S. Pat. No. 4,523,891 to Schwartz et al and owned by the Assignee herein, such patent being hereby incorporated by reference.

As those skilled in the art will appreciate, a malfunction of the control system could result in engine overspeed conditions which may damage the components of the propeller system. The aircraft may have a backup control system to assume blade pitch control should such a malfunction occur.

Some pitch control systems have a main hydromechanical controller and a back-up hydromechanical controller. An example of a pitch control system having a back-up hydromechanical controller is provided in U.S. Pat. No. 4,588,354 commonly owned the Assignee herein and hereby incorporated by reference. Other pitch control systems may have a main hydromechanical controller and an electronic controller which acts as a back-up for the hydromechanical controller and as a main controller for ground operations (reverse pitch and the like). The electronic controller instructs the mechanical pitch actuation system to set the pitch of propeller blades as may be required. In such a system, if the electronic controller fails, the propeller blades automatically go to feather.

DISCLOSURE OF INVENTION

It is an object of the invention to have an electronic control for regulating propeller blade pitch through an entire aircraft envelope.

It is an object of the invention, to provide a pitch control system with a main electronic control system and a back-up mechanical control system.

It is a further object of the invention to transfer the pitch control system from the electronic control system to the mechanical control system as required.

It is a further object of the invention to transfer the pitch control system from the electronic control system to the mechanical control system during failure modes without going to feather.

It is a further object of the invention to reset a back-up mechanical control system from providing relatively high engine revolutions per minute (while providing for overspeed protection) to providing a relatively lower engine revolutions per minute upon assuming pitch control (as the main controller) from the electronic control system.

According to the invention, a pitch control system has a main electronic control, a mechanical back-up control and a switching system for transferring pitch control from the electronic to the mechanical control in the event of electronic control failure. The switching system utilizes a switch for comparing the output of the electronic and mechanical control systems, the switch choosing the mechanical system if such comparison indicates the propeller system is going to overspeed. If the electronic control fails or loses power, an enable solenoid simultaneously disables the switch to ensure mechanical pitch change control, and sets the mechanical pitch control system to control blade pitch to provide relatively lower engine revolutions per minute than when the mechanical control system provides overspeed protection.

Other objects, features, and advantages of the present invention will be apparent from the specification and claims and from the accompanying drawings which illustrate an embodiment of the invention.

BEST MODE FOR CARRYING OUT THE INVENTION

Figure 1:
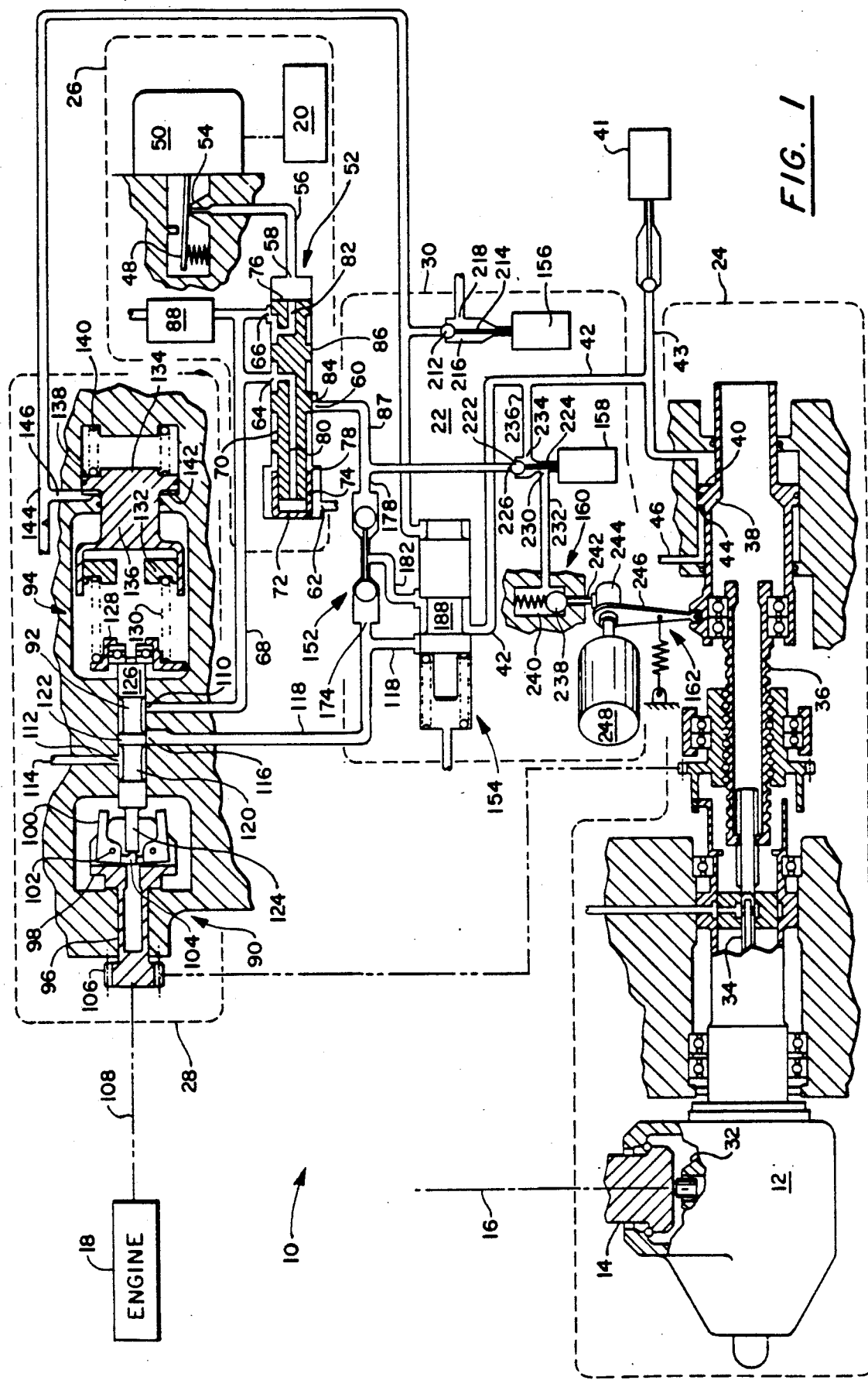
FIG. 1 is a schematic view, partly broken away of a propeller pitch control system which incorporates an embodiment of the invention.

Referring to FIG. 1, a pitch control system 10 for a propeller driven aircraft is shown. The pitch control system sets the pitch of a variable pitch propeller which includes a hub 12 supporting a plurality of blades 14. The blades are pivotally adjusted about their longitudinal axes 16. The hub is driven by an engine 18 via a suitable transmission (not shown). The pitch control system is designed to set blade pitch in either an electronic control mode (i.e. controlled by an electronic controller 20) or, a mechanical control mode (i.e. hydromechanically controlled). The mechanical control mode is utilized if a failure occurs in the electronic control mode.

The pitch control system is disposed within a housing 22 and consists of; a pitch control unit (PCU) 24, a electronic control system 26 (providing the electronic control mode), a mechanical control system 28 (providing a mechanical control mode) and a switching system 30. As will be discussed herein, the PCU receives signals from either the electronic control system or the mechanical control system to set blade pitch. The switching system controls which of the mechanical or electronic control systems provides such signals to the PCU.

PITCH ACTUATING SYSTEM

The PCU 24 utilized herein is essentially the same as the PCU disclosed in U.S. Pat. No. 4,523,891, which has been incorporated by reference herein as noted above. The PCU includes, a pitch change actuator 32 mounted within the hub 12, a torque tube 34, a ball screw 36, and a piston 38, the reciprocation of which causes the ball screw to translate longitudinally. Essentially, a signal in the form of fluid pressure, is supplied by either the electronic control system or the mechanical control system, as will be discussed infra, to the piston. Translation of the piston sets the pitch of the propeller blades 14 via the ball screw, the torque tube and the pitch change actuator as shown in U.S. Pat. No. 4,523,891.

The piston 38 is pressurized at a first surface 40 thereof with metered hydraulic pressure provided thereto through conduit 42, and at a second surface 44 with hydraulic fluid at a regulated, relatively high pressure via conduit 46. By way of example, the piston 38 may comprise a half-area servo piston. First surface 40 of the piston is approximately twice the area of second surface 44 so that fluid forces on the piston balance one another when the metered pressure is one half of the value of the regulated pressure. The piston is urged to the right (increasing blade pitch) if a net fluid force within conduit 42 is dropped to below one-half supply pressure and to the left (decreasing blade pitch) if a net fluid force within conduit 42 is increased to a value greater than one-half of the supply pressure.

A feather solenoid 41 communicates with the first surface of the piston via conduit 43. Actuation of the feather solenoid causes the solenoid to open allowing fluid pressure (i.e. an hydraulic signal) to drain from behind the first surface 40 of the piston 38 through the feather solenoid. The regulated pressure of the fluid acting on the second surface 44 of the piston, forces the piston to the right (towards high pitch) and the blades to feather.

ELECTRONIC CONTROL SYSTEM

The electronic control system consists of the electronic controller 20, a flapper 48, a torque motor 50 and a servo valve 52. The electronic controller sends pitch change signals in the form of current, as required, to the torque motor. The torque motor positions the flapper relative to a nozzle 54 to vent hydraulic fluid from conduit 56 therethrough, thereby positioning the servo valve.

The servo valve includes: a first outlet port 58 for passing hydraulic fluid via conduit 56 to the nozzle 54; a second outlet port 60 for metering a hydraulic signal (in the form of hydraulic pressure) to the switching system 30; a third outlet port 62 connected to drain pressure; a first inlet port 64 and a second inlet port 66 for receiving hydraulic fluid at regulated pressure from conduit 68; a spool 70; and, a cup 72.

The spool 70 is a half area servo, its left end 74 having an area one half the area of the right end 76 thereof. The cup 72 has an open end 78 which receives the left end of the spool for translation therein. The spool has a first interior passage 80 and a second interior passage 82. The first interior passage directs regulated pressure from the first inlet port 64 to the left hand side of the spool within the cup (the regulated fluid pressure keeps the cup pinned against the housing 22). The second interior passage directs regulated pressure from the second inlet port 66 to the right end 76 of the spool. The spool has a first land 84 and a second land 86. Because there is drain pressure at the third outlet port 62, the left side of the first land is at drain pressure. Because there is regulated pressure at the first inlet port 64, the right side of the first land 84, between the first and second lands, is at regulated pressure. Translation of the spool causes the first land to meter drain or regulated pressure through the second outlet port 60 to conduit 87 to alter the pitch of the propeller blades 14 as will be seen infra.

The electronic controller 20 provides signals to control the operation of the feather solenoid 41. Upon failure of the electronic controller, the feather solenoid is not directed to open to direct the blades to feather. If the electronic controller fails, the feather solenoid remains closed.

The electronic control system 26 may include a pressure regulating valve 88 to minimize pressure variations of the hydraulic fluid supplied via conduit 68.

MECHANICAL CONTROL SYSTEM

The mechanical control system 28 is comprised of; a flyweight assembly 90, a valve 92, and a reset assembly 94. The flyweight assembly includes a shaft 96, a housing 98 attaching to the shaft, and a pair of flyweights 100 connected to the housing via pivots 102. Each of the flyweights includes a radially inwardly extending leg 104. The shaft has a gear 106 formed integrally therewith, the gear rotating with the engine 18 via a suitable linkage 108.

The valve 92 consists of; a first port 110 communicating with conduit 68 at regulated pressure, a second port 112 communicating with conduit 114 at lubrication pressure (a relatively low pressure compared to regulated pressure but a relatively higher pressure than drain pressure to provide lubricating fluid to rotating components), a third port 116 communicating with conduit 118 for metering regulated or lubrication pressure to the switching system 30, and a reciprocating spool 120.

The spool 120 has a metering land 122 for controlling the flow of hydraulic fluid from either the first or the second ports 110, 112 through the third port 116, a first end portion 124 abutting the legs 104 the flyweights 100, and a second end portion 126 attaching to the reset assembly 94.

The reset assembly 94 controls the point, as a function of engine rotational speed, at which the mechanical control system 28 assumes command from the electronic control system 26. In normal flight, the mechanical control system will assume the command function if engine speed meets or exceeds, for example, 114% (the actual percentage may vary) of rated engine speed. To test whether the mechanical system is operative, the reset system will set the mechanical control system to assume the control function at something less than rated speed, i.e. 95%. By utilizing a lesser percentage, a pilot may readily discern that the mechanical control system is operational. The reset system also adjusts the control point to 95% during flight during certain failure modes, as will be discussed infra.

The reset assembly 94 includes a first spring seat 128 abutting the second end portion 126 of the spool 120, a compression spring 130 having a left side abutting the first spring seat, a second spring seat 132 abutting a right side of the compression spring, a reset piston 134, and a shaft 136 connecting the reset piston and the second spring seat. The spool is urged longitudinally into abutment with the flyweights by the compression spring 130.

The reset piston 134 has a first face 138 abutting a second compression spring 140 for urging the reset piston (and the spool) to the left, and a second face 142 communicating with regulated pressure in conduit 144 via inlet port 146.

As is known in the art, changes in centrifugal force associated with changing the speed of rotation of flyweights 100 causes the flyweights to pivot, such pivoting displacing the ends of legs 104 thereby. If the engine speed increases (indicating a tendency towards overspeed), the legs pivot outwardly, moving the spool to the right thereby metering lubrication pressure to the switching system. If the engine speed decreases, the spool is moved to the left by the first compression spring thereby metering regulated pressure to the switching system.

SWITCHING SYSTEM

The switching system 30 comprises a least selector valve 152, valve 154, an enable solenoid 156, a ground operation solenoid 158, a low pitch stop valve 160, and a feedback linkage 162.

Figure 2:
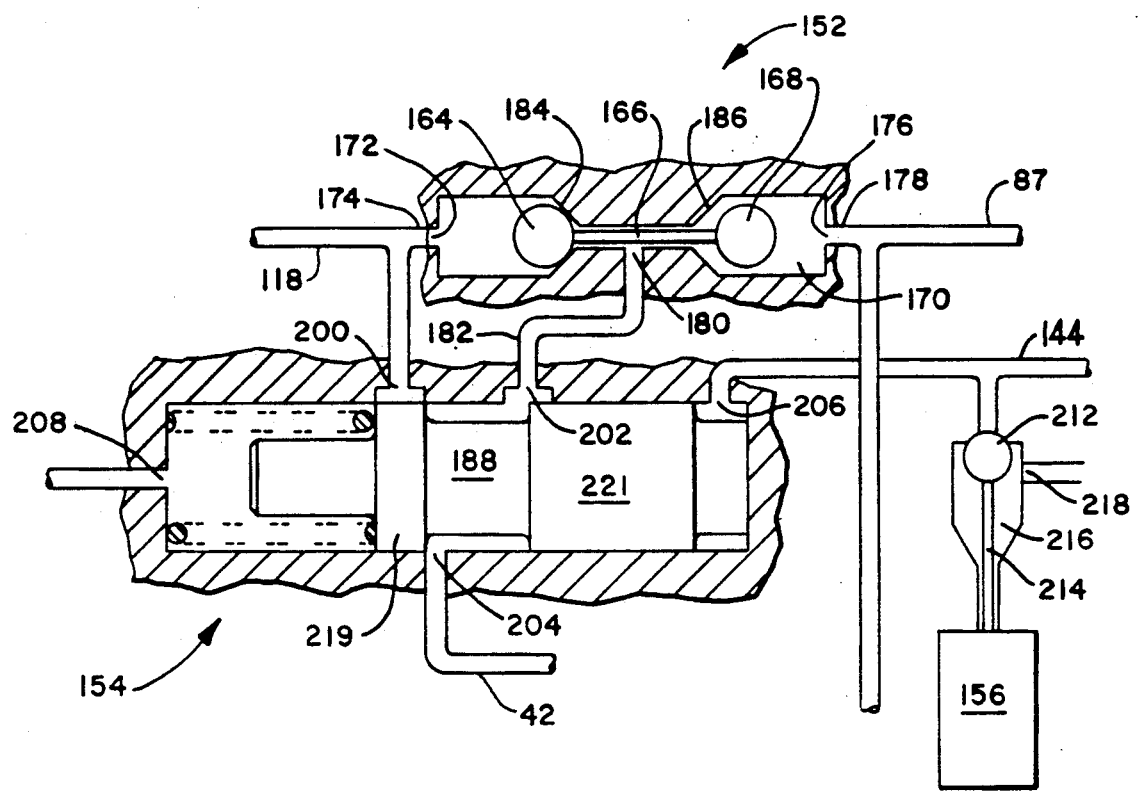
FIG. 2 is an enlarged view of a portion of FIG. 1.

The least selector valve 152 (see FIG. 2) comprises a first ball valve element 164 which is interconnected by a rod 166 to a second ball valve element 168, and is disposed within a space 170 within the housing 22. The space defines; a first inlet 172 which communicates with conduit 118 via conduit 174, a second inlet 176 which communicates with conduit 87 via conduit 178, an outlet 180 which communicates with the enable valve 154 via conduit 182, a first valve seat 184 for seating the first valve element and a second valve seat 186 for seating the second ball valve element.

The valve 154 has a first inlet port 200 communicating with conduit 118, a second inlet port 202 communicating with conduit 182, a third port 208 communicating with drain pressure, a fourth port 206 communicating with conduit 144 a fifth port 204 communicating with conduit 42, and a spool 188. The spool has a first land 219 for metering hydraulic pressure from conduit 118 to conduit 42 and a second land 221 for metering hydraulic pressure from conduit 182 to conduit 42.

The enable solenoid 156 attaches to a ball valve 212 via rod 214. The ball valve is disposed within a chamber 216 having; an inlet port 218 communicating with regulated pressure via conduit 118 and an outlet port communicating with conduit 144. The enable solenoid is shown in the activated position. Failure or deactivation of the solenoid moves the rod and ball valve downwardly to allow regulated pressure to be communicated to the reset piston and to the spool 188.

The ground operation solenoid 158 is connected to a ball valve 222 via a rod 224. The ball valve seats in a chamber having a first port 226 communicating with conduit 87, a second port 230 communicating with a conduit 232, and a third port 234 communicating with conduit 42 via conduit 236.

The low pitch stop valve 160 consists of a ball valve 238 seated in chamber 240. The ball attaches via a rod 242 to a cam 244. The cam is attached via a linkage 246 to the piston 38 for translation therewith. Translation of the piston towards low pitch rotates the cam 244, popping open the ball valve 238, and allowing hydraulic fluid from the first side 40 of the piston to drain therethrough, via conduits 42, 236, 232 thereby allowing regulated pressure on the second side of the piston to drive the piston to the right towards high pitch. A resolver 248 is attached to the linkage 246 to transmit the position of the piston 38 (and the position of the blades 14 thereby) to the electronic controller 20 thereby closing a control loop.

OPERATION

Normal pitch change logic and scheduling is controlled directly by the electronic controller 20. During flight operation, the electronic controller selects the optimum propeller RPM and controls the propeller blade pitch through the electronic control system 26. Synchrophasing is also provided by the electronic controller by biasing propeller pitch. Direct blade pitch control for pitch reversal and for ground handling as a function of a pilot controlled power lever (not shown) is also scheduled by the electronic controller. For such ground control, the ground enable solenoid 158 is deenergized to disable the low pitch stop valve 160 so that fluid will not port through the low pitch stop valve if the blades go to very low or reverse pitch. To go to feather, the electronic controller energizes the feather solenoid 41 (the feather solenoid may also be pilot activated via another circuit which is not shown).

In normal operation, the electronic controller 20 sends a signal to change blade pitch to the torque motor 50. The torque motor moves the flapper 48 toward or away from the nozzle 54 thereby increasing or decreasing pressure in conduit 56. As a result of the pressure changes in the conduit, the spool strokes 70, thereby metering regulated pressure or drain pressure (which acts as an hydraulic signal) in conduit 87. In the mechanical control system, the enable solenoid 156 is energized so that the reset piston is urged to the left by the second compression spring (i.e. regulated pressure is not brought to bear upon the second face 142 of the reset piston 134). Relatively high pressure is metered by the spool 120 via conduit 118 to the switching system 30.

The least selector valve 152 compares the fluid pressure in conduit 118 via conduit 174 with the fluid pressure in conduit 87 via conduit 178. In normal operation, the relatively high pressure in conduit 118, causes the first valve element 164 of the switching valve to seat in the first valve seat 184. As a result, fluid pressure metered by the servo valve 52 is communicated via conduits 87, 178, 182, and 42 to the piston 38. As noted above, translation of the piston sets the pitch of the propeller blades via the ball screw, the torque tube and the pitch change system.

If the electronic control system fails while metering a relatively high pressure signal to the piston (i.e. if the flapper 48 is trapped against the nozzle 54), the propeller blades 14 will tend towards low pitch. A low pitch setting may cause the propeller blades (and the engine thereby) to go to overspeed. Engine speed is sensed via gear 106, the higher rotation of which causes the flyweights 100 to pivot radially outwardly, thereby urging the spool 120 to the right by legs 104. The spool then meters fluid at relatively low lubricating pressure to the least selector valve 152 via conduit 118 and conduit 174. The least selector valve compares the relatively high pressure in conduit 87 with the relatively low pressure in conduit 118, shuttling the least selector valve to the left thereby seating the second valve element 168 within the second valve seat 186. As a result, fluid pressure metered by the mechanical control system is passed via conduits to the piston. Further, if transient conditions cause the propeller blades to go towards low pitch, the switching system will also react by switching to the mechanical control system as stated above.

If the electronic controller senses a failure in the electronic control system or otherwise, or if the electronic controller loses power, the enable solenoid 156 is deenergized, moving the rod and ball valve downwardly to allow regulated pressure to be communicated to the reset piston and to the spool 188. The regulated pressure is communicated to the valve 154 via the fourth port 206 shuttling the spool 188 to the left. The second land 221 shuts off flow from the least selector valve 152 from conduit 182 (effectively disabling the least selector valve. The first land moves to the right to allow the mechanical control system to regulate the pitch of the propeller blades through conduits 118 and 42 and ports 200 and 204.

The regulated pressure is also communicated to the second face 142 of the reset piston 134 thereby shuttling the reset piston to the right to meter relatively low lubricating pressure to the piston 38 allowing the piston 38 to move towards relatively high pitch. The mechanical control system sets the pitch of the propeller blades at 95% of rated speed.

In the prior art, if the electronic controller failed or lost power, a relatively low pressure signal sent thereby would cause the propeller blades to go to feather. In the present invention, the switching system allows the blades to be governed by the mechanical back-up upon receiving a low pressure signal from the electronic controller thereby avoiding having a propeller system at feather. That propeller may then assist in powering the aircraft, a key safety feature as one might imagine. A feathered propeller will not power an aircraft. By utilizing a switch, such as the enable valve 154 or the enable solenoid, to disable the least selector valve 152, the switching system ensures that the mechanical control system controls blade pitch in certain failure modes as stated above. By resetting the mechanical control system to a lesser engine speed if the electronic control system fails, the mechanical control system provides a safer, quieter and more vibration free flight for aircraft passengers.

Although the invention has been shown and described with respect to a best mode embodiment thereof, it should be understood by those of ordinary skill in the art that the foregoing and various other changes, omissions and additions in the form and detail thereof may be made therein without departing from the spirit and scope of the invention thereof.

We claim:

1. A control system for a variable pitch propeller system, the propeller system having a plurality of variable pitch propeller blades mounted to a hub and a pitch actuator for setting the pitch of the blades, said control system comprising;

an electronically controlled main pitch control system for providing a first signal of given magnitude to said pitch actuator to set the pitch of said blades, a mechanically controlled back-up pitch control means for setting the pitch of said blades, said means providing either a second signal of given magnitude or a third signal of given magnitude to said pitch actuator to set the pitch of said blades, said means passing said second signal if said propeller system is approaching an overspeed condition and passing said third signal if said means assumes a main control function, said magnitude of said second signal controlling said blade pitch to a given pitch, said magnitude of said third signal controlling said blade pitch to a lesser pitch than said second signal, a switching system having a means for comparing the magnitude of said first signal provided by said electronically controlled main pitch control system and said second signal provided by said mechanically controlled pitch control means, said switching system passing that one of said signals which has a lesser magnitude so as to avoid an overspeed condition to said pitch actuator, and means for simultaneously setting said mechanical pitch control means to pass said third signal and for setting said switching system to disable said means for comparing such that said switching system passes said third signal directly to said pitch actuator if said electronically controlled pitch control system is not operating properly.

2. The control system of claim 1 wherein said means for simultaneously setting comprise;

a pressure source, and means for simultaneously directing said pressure source to said switching system to set said switching system for disabling said means for comparing and to said mechanical pitch control means to reset said mechanical pitch control means to provide said third signal.

3. The control system of claim 2, wherein said means for simultaneously directing comprises;

a solenoid, said solenoid porting said pressure source to said mechanical pitch control means and to said switching system upon the deenergized of said solenoid.

4. The control system of claim 3, wherein said means for simultaneously setting further comprises;

a valve for disabling a flow of said first or said second signal form said means for comparing and for passing a flow of said third signal to said pitch actuator to set the pitch of said propeller blades upon receiving pressure form said pressure source.

5. The control system of claim 2, wherein said means for simultaneously setting further comprises;

a valve for disabling a flow of said first or said second signal form said means for comparing and for passing a flow of said third signal to said pitch actuator to set the pitch of said propeller blades upon receiving pressure from said pressure source.

* * * * *

UNITED STATES PATENT AND TRADEMARK OFFICE
CERTIFICATE OF CORRECTION

PATENT NO. : 5,037,271

DATED : August 6, 1991

INVENTOR(S) : Jerome G. Duchesneau and Robert A. Schwartz

It is certified that error appears in the above-identified patent and that said Letters Patent is hereby corrected as shown below:

Column 8

Claim 3, line 33 "deenergized" should be --deenergizing--.

Claim 4, line 38 "form" should be --from--.

Claim 5, line 45 "form" should be --from--.

Signed and Sealed this

Fifteenth Day of June, 1993

Attest:

MICHAEL K. KIRK

Attesting Officer

Acting Commissioner of Patents and Trademarks